3,313,847
PROCESS OF PREPARING MONOMERIC DICARBOXYLIC ACIDS CONTAINING AMIDE LINKAGES
Cilton W. Tate and Nicholas R. Congiundi, Cary, N.C., assignors to Monsanto Company, a corporation of Delaware
No Drawing. Filed Jan. 9, 1964, Ser. No. 336,613
4 Claims. (Cl. 260—518)

This invention relates to a novel method for preparing monomeric dicarboxylic compounds having internal amide linkages and is a continuation-in-part of our application Ser. No. 76,095, filed Dec. 16, 1960, and titled, "Monomeric Dicarboxylic Acids Containing Amide Linkages," The compounds obtained in accordance with the method of this invention are especially useful as a reactant in the production of linear ester-amide interpolymers.

There has been a long history of attempts to discover some method of forming synthetic, linear ester-amide interpolymers which retain the desirable properties of polyesters, such as the polyethylene terephthalate esters but which also include amide linkages for improving dyeability, processibility, moisture absorption and the like.

The earlier polyester-amides were obtained by a direct co-reaction of glycol, dicarboxylic acid and diamine. In the preparation of ester-amide interpolymers by this means, there are competing reactions of polyester formation and polyamide formation, and the properties of the resulting products were disappointing. There followed an attempt to improve the properties of the ester-amide polymer by employing an excess of ester during preparation in order to overcome the tendency for polyamide formation to take place in preference to polyester formation. However, the melting points of the resulting polymers were still very low and they did not attain commerical acceptance.

Recently, it has been found that greatly improved polyester-amide polymers with recurring rather than random structural groups can be obtained by reacting a preformed dicarboxylic monomer having stable internal amide linkages with an alkylene glycol. A polymer with a regular rather than a random structure is obtained since there are no competing polyester and polyamide reactions during polymerization. Instead, the polymer-forming reaction is between the preformed dicarboxylate monomer with internal amide linkages and the bifunctional glycol. The products obtained by this method show a marked improvement over the ester-amides of random structure which are obtained by co-reacting a glycol, dibasic acid and diamine.

The significant advance, which made possible the preparation of ester-amide interpolymers of regular structure, was the introduction into the art of monomers which contained stable internal amide linkages and could enter into polyester-forming reactions. Such compounds which have been employed for this purpose are di-esters with built-in amide groups. A typical example is an ester of the following formula

wherein n represents an integer of from 1 to 4, R represents a polymethylene radical containing from 1 to 10 carbon atoms and R' represents an alkyl radical containing from 1 to 6 carbon atoms.

Monomeric compounds of the above-noted type have been prepared by reacting two molar portions of a monoacid chloride of a bifunctional dibasic acid monoester with one molar portion of a suitable diamine. The reaction must be carried out in the presence of a basic material, generally pyridine is used. Thus, for example, a particular monomeric ester of the type illustrated by the formula shown above is generally prepared by reacting one molar portion of p-xylene diamine with 4-carbisobutoxybenzoyl chloride in the presence of pyridine to remove the hydrochloric acid by-product.

It is readily apparent that the afore-noted preparation is rather costly. That is, a complicated synthesis is involved to produce the mono acid chloride of a dibasic acid monoester needed for the preparation. In addition, basic materials in large excess must be introduced into the reaction to remove the hydrochloric acid produced. Furthermore, the basic material, such as the commonly used pyridine, is removed from the monomer product only with the greatest difficulty. Thus, in instances where the use of these monomers is contemplated for the production of polymeric end-products which are normally sold at relatively low mark-ups, an economic and convenient method for producing these polymers is greatly desired.

It is accordingly an object of this invention to provide a new and improved method for producing difunctional monomeric compounds which contain stable internal amide linkages, and which are adaptable for use in polymerizations to yield ester-amide interpolymers.

It is further an object of this invention to provide a method for producing monomers suitable for use as a reactant in polymerizations to yield ester-amide interpolymers, said method conferring sufficient economies to render the production of such polymeric end-products as fibers commercially practical.

Other objects will be apparent from the description and claims which follow:

These and other objects are attained by means of this invention as described in detail hereinafter with particular reference to certain preferred embodiments thereof. The method embodying this invention is directed to the preparation of dicarboxylic acid compounds of the following general formula

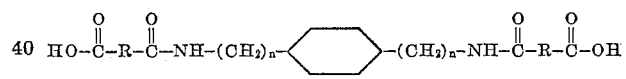

wherein n represents an integer of from 1 to 4 and each R is a polymethylene group containing from 5 to 10 carbon atoms.

It has been surprisingly found that when a salt strike is made with certain select diamines and a slight excess of certain diacids, a salt prepcipitates quantitatively which upon analysis is shown to consist of one mole of the diamine employed and two moles of the diacid. This is in sharp contrast to the usual experience in the formation of salts from diamines and diacids where these reactants combine in a 1:1 molar ratio. Thus, for example, when hexamethylene diamine is combined with excess adipic acid, a salt with a molar ratio at 1:2 in favor of the diacid does not precipitate from solution.

Generally speaking, the method of this invention comprises the following steps: (1) A one molar quantity of a suitable diamine is first introduced into a reaction medium of water after which a molar quantity of an appropriate diacid is added. (2) The diacid addition is then continued until a pH in the range of from about 7.4 to 4.5 is attained after which the salt precipitates from solution. (3) The precipitated salt is recovered from the solution and thereafter converted into the corresponding diamide by the elimination of water in accordance with conventional procedures, for example, employing elevated temperatures and reduced pressures.

Among the suitable acids which may be used for the purposes of this invention are those saturated acids of the general formula HOOC(CH$_2$)$_n$COOH where n is an integer of from 5 to 10. These diacids are exemplified by heptanedioic acid, octanedioic acid, nonanedioic acid, decanedioic acid, undecanedioic acid and dodecanedioic acid.

The diamines which have been found useful in the practice of this invention are those of the general formula

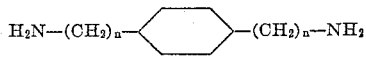

wherein n is an integer of from 1 to 4. Illustrative compounds of this type are bisaminomethyl benzene; 1,4 bis-(2-aminoethyl)-benzene; 1,4-bis-(3-aminopropyl) benzene and 1,4-bis-(4-aminobutyl)-benzene.

The practice of this invention is illustrated by the following examples, it being understood that other reactants fall within the scope of this invention to prepare the monomers under consideration.

*Example I*

To a solution containing 5.6 grams (0.034 mole) of bis-(2-aminoethyl)benzene in 20 ml. of $H_2O$ there was added 15.0 gram (0.08 mole) of nonanedioic aid in finely powdered form. The mixture began with a slight yellow coloration and a pH of 8, but very quickly as the acid began to dissolve and react, there was a change to a white slurry of finely divided particles and the pH rapidly fell below 6. After an hour the mixture became a white paste. Addition of 180 ml. of $H_2O$ followed by stirring at 65° C. for 30 minutes resulted in a pale yellow solution, pH 5. The mixture was cooled slowly with stirring and reprecipitation began as the temperature fell below 50° C. The white salt (27.5 grams) was collected by filtration and air dried. The melting point of the compound was found to be between 179.5° and 180° C. Analysis of the compound gave 62.37 percent carbon, 8.73 percent hydrogen and 5.23 percent nitrogen. Theoretical for the diamine diacid salt having a molar ratio of 2:1 in favor of the diacid is 62.25 percent carbon, 8.89 percent hydrogen and 5.18 percent nitrogen.

The salt as obtained above was placed in a 200 ml. round bottom flask equipped with a thermometer well and a Claissen head. The flask was heated in a silicon oil bath at 200° C. under full oil pump vacuum for three hours, after which the temperature reached 180° C. By eliminating water from the salt in this manner the diacid containing internal amide groups was formed.

*Example II*

To a solution containing 5.6 grams (0.034 mole) of bis-(2-aminoethyl)benzene in 20 ml. of water there was added 16.1 grams (0.08 mole) of sebacic acid. The mixture at the start had a pH of 8. After dilution with 180 ml. of water followed by stirring at 65° C. for 30 minutes, the pH of the solution dropped to a value of 5. The mixture was cooled slowly with stirring and precipitation began as the temperature fell below 50° C. The salt (18.8 grams) was collected by filtration and dried. Analysis of the compound gave 63.65 percent carbon, 9.04 percent hydrogen and 4.74 percent nitrogen. Theoretical for the diamine-diacid salt having a molar ratio of 2:1 in favor of the diacid is 63.50 percent carbon, 9.15 percent hydrogen and 4.76 percent nitrogen.

The salt as obtained above was placed in a 200 ml. round bottom flask equipped with a thermometer well and a Claissen head. The flask was heated in a silicon oil bath at 200° C. under full oil pump vacuum for three hours, after which the temperature reached 180° C. By eliminating water from the salt in this manner the diacid containing internal amide groups was formed.

*Example III*

A molar quantity (164 grams) of 1,4-bis-(2-aminoethyl)-benzene was added to 500 ml. of distilled water. To this mixture there was then added a molar quantity (188 grams) of nonanedioic acid, and the addition of the acid was continued until a pH of 7.4 was obtained at which time a precipitate began to form. The precipitate thus formed was filtered off and dried. 105 grams of this salt was recrystallized from 1 liter of water with charcoal treatment. After cooling, the crystals were filtered and dried in a vacuum oven at 70°–75° C. The yield of the salt was 84 grams, and the compound had a melting point of from 182°–185° C.

54 grams (0.1 M) of the purified salt was placed in a 200 ml. round bottom flask equipped with a thermometer well and a Claissen head. The flask was heated in a silicon oil bath at 200° C. under full oil pump vacuum for three hours, after which the temperature in the flask reached 180° C. By eliminating water from the salt in this manner the diacid containing internal amide groups was formed.

*Example IV*

In order to demonstrate the suitability of the salt produced in the above-described example for use as a monomer in the production of ester-amide interpolymers a polymerization was run as follows:

The dicarboxylic acid compound containing internal amide linkages of Example III above was slurried with 180 ml. of ethylene glycol. This mixture was then transferred to a standard glass polyester reactor. To this reaction mixture there was then added approximately 0.1 percent by weight of p-toluenesulfonic acid as a polymerization catalyst. During the ensuing reaction, 174 ml. of excess glycol was stripped off at atmospheric pressure over a period of about 50 minutes. The polymerization was then completed at a temperature of 287° C. and a pressure of from 0–15 millimeters of mercury. This pressure reduction and finishing cycle required 50 minutes and gave off an additional 50 ml. of distallate. The ester-amide interploymer obtained had a melting point of 230° C., was white in color and found to be fiber forming.

Any of the other dicarboxylic acid monomers as described herein can be prepared in the same manner as outlined in Example I above. They may also be readily condensed with ethylene glycol as shown in Example II above, or with other straight or branched chain glycols, such as trimethylene glycol, tetramethylene glycol, pentamethylene glycol, hexamethylene glycol, octamethylene glycol, decamethylene glycol, 2-2 - dimethyl - 1,3-propanediol or the like. The condensation may be conducted with or without another bifunctional reactant, such as terephthalic acid, to form highly polymerized materials capable or orientation and useful for the manufacture of synthetic fibers, films and the like.

The monomer preparation method of this invention may be employed in a batchwise or continuous manner. The monomeric character of the product produced makes possible the preparation of homogeneous condensation polymers containing amide groups effective for greatly enhancing dyeability and moisture absorption without the deleterious effects of competing polyester and polyamide reactions in the polymerization.

The invention has been described in detailed with particular reference to certain preferred embodiments thereof, but it will be understood that variations and modifications can be effected within the spirit and scope of the invention as described hereinabove and as defined in the appended claims.

We claim:

1. A method for the production of a monomeric dicarboxylic acid compound of the formula

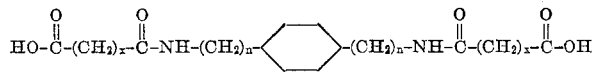

wherein x represents an integer of from 5 to 10 and n represents an integer of from 1 to 4, which comprises introducing into an aqueous reaction medium a molar proportion of a diamine of the general formula

wherein y is an integer of from 1 to 4, and thereafter adding a saturated diacid of the general formula $$HOOC(CH_2)_xCOOH$$

wherein x is an integer of from 5 to 10 until a pH in the range of from about 7.4 to 4.5 has been obtained in the reaction mixture resulting in the precipitation of a salt from solution, recovering the precipitated salt after which said salt is dried and purified by recrystallization, thereafter causing water to be eliminated from said purified salt by subjecting said salt to conditions of elevated temperature and reduced pressure and thereby effecting the formation of intra-molecular amide groups.

2. The method of claim 1 where said saturated diacid is nonanedioic acid.

3. The method of claim 1 where said diamine is 1,4-bis-(2-aminoethyl)-benzene.

4. A method for the production of a monomeric dicarboxylic acid compound of the formula

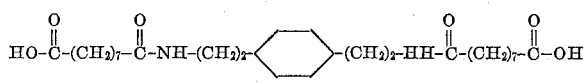

which comprises introducing into an aqueous reaction medium a molar proportion of 1,4-bis-(2-aminoethyl)-benzene and thereafter adding nonanedioic acid until a pH of 7.4 to 4.5 has been obtained in the reaction mixture resulting in the precipitation of a salt from solution, recovering the precipitated salt after which said salt is dried and purified by recrystallization, thereafter causing water to be eliminated from said purified salt by subjecting said salt to conditions of elevated temperature and reduced pressure and thereby effecting the formation of intra-molecular amide groups.

References Cited by the Examiner

UNITED STATES PATENTS 2,071,250   2/1937   Carothers _____ 260—78

LORRAINE A. WEINBERGER, *Primary Examiner.*

DANIEL D. HORWITZ, *Examiner.*

A. THAXTON, *Assistant Examiner.*

UNITED STATES PATENT OFFICE
CERTIFICATE OF CORRECTION

Patent No. 3,313,847                          April 11, 1967

Cilton W. Tate et al.

It is hereby certified that error appears in the above numbered patent requiring correction and that the said Letters Patent should read as corrected below.

Column 3, line 20, for "aid" read -- acid --; column 5, lines 20 to 22, the right-hand protion of the formula should appear as shown below instead of as in the patent:

$$—(CH_2)_2-NH-\overset{\overset{O}{\|}}{C}-(CH_2)_7-\overset{\overset{O}{\|}}{C}-OH$$

Signed and sealed this 21st day of November 1967.

(SEAL)
Attest:

Edward M. Fletcher, Jr.                        EDWARD J. BRENNER
Attesting Officer                              Commissioner of Patents